(12) United States Patent
Hou et al.

(10) Patent No.: US 11,260,763 B2
(45) Date of Patent: Mar. 1, 2022

(54) CHARGING PILE SYSTEM OF PARALLEL CHARGING PILES AND METHOD

(71) Applicant: Huawei Technologies Co., Ltd., Shenzhen (CN)

(72) Inventors: Yangxun Hou, Dongguan (CN); Yongjin Lin, Shenzhen (CN); Wenbo Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 16/511,506

(22) Filed: Jul. 15, 2019

(65) Prior Publication Data

US 2019/0337405 A1 Nov. 7, 2019

Related U.S. Application Data

(63) Continuation of application No. PCT/CN2018/072782, filed on Jan. 16, 2018.

(30) Foreign Application Priority Data

Jan. 16, 2017 (CN) .......................... 201710030716.X

(51) Int. Cl.
*B60L 53/16* (2019.01)
*B60L 53/18* (2019.01)
(Continued)

(52) U.S. Cl.
CPC ............... *B60L 53/11* (2019.02); *B60L 53/16* (2019.02); *B60L 53/18* (2019.02); *B60L 53/305* (2019.02); *B60L 53/67* (2019.02)

(58) Field of Classification Search
CPC ........ B60L 53/16; B60L 53/305; B60L 53/18; B60L 53/30; B60L 53/11; B60L 53/67
(Continued)

(56) References Cited

U.S. PATENT DOCUMENTS 6,437,544 B1 * 8/2002 Yang ..................... H02J 7/345
320/166
2004/0227617 A1 11/2004 Vasquez et al.
(Continued)

FOREIGN PATENT DOCUMENTS

| CN | 102222954 A | 10/2011 |
|---|---|---|
| CN | 103972969 A | 8/2014 |

(Continued)

OTHER PUBLICATIONS

Machine Translation and Abstract of Japanese Publication No. JP2009225638, Oct. 1, 2009, 16 pages.
(Continued)

*Primary Examiner* — Richard Isla
*Assistant Examiner* — Dung V Bui
(74) *Attorney, Agent, or Firm* — Conley Rose, P.C.

(57) ABSTRACT

A charging pile system includes at least two charging piles, charging plugs disposed on the charging piles, the charging plugs are configured to charge a load, and the charging plugs include power cables and communications cables. A charging plug socket is further disposed on at least one charging pile, and the charging plug socket is configured to insert the charging plug on another charging pile into the charging pile on which the charging pile socket is disposed.

19 Claims, 5 Drawing Sheets

(51) Int. Cl.
  *B60L 53/30* (2019.01)
  *B60L 53/10* (2019.01)
  *B60L 53/67* (2019.01)

(58) Field of Classification Search
  USPC .......................................................... 320/109
  See application file for complete search history.

(56) References Cited

U.S. PATENT DOCUMENTS

| | | | | |
|---|---|---|---|---|
| 2008/0194151 | A1* | 8/2008 | Gleissner | H01R 29/00 439/660 |
| 2012/0164489 | A1* | 6/2012 | Okada | H01M 10/46 429/7 |
| 2012/0326668 | A1* | 12/2012 | Ballatine | H02J 4/00 320/109 |
| 2013/0009591 | A1* | 1/2013 | Demetriades | H02J 7/35 320/101 |
| 2014/0021922 | A1* | 1/2014 | Kim | H02J 7/0003 320/111 |
| 2014/0179164 | A1 | 6/2014 | Kanamori et al. | |
| 2016/0052416 | A1 | 2/2016 | Wietfeld et al. | |
| 2016/0105039 | A1* | 4/2016 | Jeon | H01M 10/425 320/128 |
| 2016/0121735 | A1* | 5/2016 | Sugano | B60L 53/305 320/109 |
| 2016/0193932 | A1* | 7/2016 | Vaghefinazari | B60L 53/665 320/109 |
| 2016/0368390 | A1* | 12/2016 | Yang | B60L 1/003 |

FOREIGN PATENT DOCUMENTS

| | | |
|---|---|---|
| CN | 204559201 U | 8/2015 |
| CN | 205231779 U | 5/2016 |
| CN | 105680514 A | 6/2016 |
| CN | 105990883 A | 10/2016 |
| CN | 106026316 A | 10/2016 |
| CN | 106042952 A | 10/2016 |
| CN | 106080236 A | 11/2016 |
| CN | 106160054 A | 11/2016 |
| EP | 0533317 A2 | 3/1993 |
| EP | 2815913 A1 | 12/2014 |
| JP | H11285109 A | 10/1999 |
| JP | 2009225638 A | 10/2009 |
| WO | 2014023349 A1 | 2/2014 |
| WO | 2014114515 A2 | 7/2014 |

OTHER PUBLICATIONS

Machine Translation and Abstract of Japanese Publication No. JPH11285109, Oct. 15, 1999, 21 pages.
"Connecting Two UPSs or Inverters Together for Double the Output Power," XP054979700, Dec. 4, 2012, 5 pages.
Foreign Communication From A Counterpart Application, European Application No. 18739086.9, Extended European Search Report dated Sep. 27, 2019, 8 pages.
Machine Translation and Abstract of Chinese Publication No. CN106026316, Oct. 12, 2016, 12 pages.
Machine Translation and Abstract of Chinese Publication No. CN106042952, Oct. 26, 2016, 11 pages.
Machine Translation and Abstract of Chinese Publication No. CN106080236, Nov. 9, 2016, 11 pages.
Machine Translation and Abstract of Chinese Publication No. CN204559201, Aug. 12, 2015, 12 pages.
Machine Translation and Abstract of International Publication No. WO2014114515, Jul. 31, 2014, 10 pages.
Foreign Communication From A Counterpart Application, PCT Application No. PCT/CN2018/072782, English Translation of International Search Report dated Mar. 28, 2018, 2 pages.
Foreign Communication From A Counterpart Application, PCT Application No. PCT/CN2018/072782, English Translation of Written Opinion dated Mar. 28, 2018, 4 pages.

* cited by examiner

CHARGING PILE SYSTEM OF PARALLEL CHARGING PILES AND METHOD

CROSS-REFERENCE TO RELATED APPLICATIONS

This application is a continuation application of International Patent Application No. PCT/CN2018/072782, filed on Jan. 16, 2018, which claims priority to Chinese Patent Application No. 201710030716.X, filed on Jan. 16, 2017. The disclosures of the aforementioned applications are hereby incorporated by reference in their entireties.

TECHNICAL FIELD

The present disclosure relates to the field of charging technologies, and in particular, to a charging pile system of parallel charging piles and a method.

BACKGROUND

Currently, a low power car and a high power bus are mainstream vehicle types in a direct current electric vehicles market. Vehicle types with different power level requirements need to be considered during construction of a charging station. If all charging piles are designed based on high power, resources are wasted when a low power vehicle uses the charging pile. In addition, for a scenario such as a parking lot, installation space is limited, and installation flexibility of a high power charging pile is insufficient. Therefore, in other approaches, a charging requirement of a high power vehicle is met by increasing a single power capacity.

FIG. 1 shows a technical solution in other approaches. For instance, after being cascaded, charging piles charge a high power vehicle, a power cable is configured to transmit energy, and a communications cable is configured to cascade charging pile controllers. The power cable and the communications cable are installed under the ground. FIG. 2 shows another technical solution in other approaches. For instance, a unified charging pile power module power supply system is established at the background, and when a charging pile at the foreground charges a vehicle for a user, the charging pile power module power supply system at the background charges each charging pile. In other approaches, there are the following disadvantages. Construction difficulty is increased; trenching, layout, and cable layout need to be performed in advance; a station construction period is prolonged; manpower costs are increased; and the power cable and the communications cable are installed under the ground, and when a fault occurs, maintenance is difficult, and total costs of the system is increased due to costs of the cables.

SUMMARY

Embodiments of the present disclosure provide a charging pile system of parallel charging piles and a method. An existing charging pile in the charging pile system is improved, and power of existing charging piles is interconnected by using charging plugs, to resolve a problem that the power of the charging piles cannot be interconnected in a cost-effective and highly efficient manner when power of one charging pile in the charging pile system is less than a power requirement of load.

A first aspect of the embodiments of the present disclosure provides a charging pile system of parallel charging piles, where the charging pile system includes at least two charging piles, a charging plug is disposed on each charging pile, the charging plug is configured to charge load, and the charging plug includes a power cable and a communications cable, where a charging plug socket is further disposed on at least one charging pile, one end of the charging plug socket is connected to a power unit inside the charging pile on which the charging plug socket is disposed, and the other end of the charging plug socket is configured to be connected to a charging plug that is on another charging pile and that is inserted into the charging pile on which the charging plug socket is disposed; and when one charging pile on which the charging plug socket is disposed charges the load and a power requirement of the load is greater than power output of the one charging pile that charges the current load and on which the charging plug socket is disposed, the one charging pile is configured to insert the charging plug on the another charging pile in the charging pile system into the charging pile on which the charging plug socket is disposed, so that the power output of the charging pile that charges the current load meets the power requirement of the current load.

In an embodiment, a controller is further disposed on each charging pile, and the controller is configured to control the charging pile to perform actions, including controlling the charging pile to communicate with the load or another charging pile, charge or discharge, send or receive an instruction, and the like.

In an implementation of the first aspect, after detecting that the charging plug on the another charging pile is connected to the charging plug socket on the one charging pile on which the charging plug socket is disposed, the one charging pile on which the charging plug socket is disposed is configured to output power of at least two connected charging piles to the load.

When the one charging pile on which the charging plug socket is disposed charges the load and the power requirement of the load is greater than the power output of the one charging pile that charges the current load and on which the charging plug socket is disposed, after the system sends an instruction used for instructing to insert the charging plug on the another charging pile in the charging pile system into the one charging pile on which the charging plug socket is disposed, the method further includes, after the system obtains an instruction used for indicating that the charging plug is connected to the charging socket, jointly outputting, by the two connected charging piles, electric energy for the load.

In an implementation, when there are a plurality of other charging piles in the charging pile system, the plurality of other charging piles are configured to be sequentially connected, in series by using respective charging plugs, to the one charging pile on which the charging plug socket is disposed.

In an implementation, when the one charging pile on which the charging plug socket is disposed charges the load and the power requirement of the load is greater than the power output of the one charging pile that charges the current load and on which the charging plug socket is disposed, the one charging pile is configured to, after determining one or more idle-state charging piles that are closest to the one charging pile that charges the current load and on which the charging plug socket is disposed, send an instruction used for instructing the one or more idle-state charging piles that are closest to the one charging pile to be sequentially connected, in series by using respective charging plugs, to the one charging pile on which the charging plug socket is disposed.

In an implementation, on the one charging pile on which the charging plug socket is disposed, the charging plug socket is configured to be connected to an output end of the power unit inside the charging pile by using a contactor, to form a serial connection to the power unit, so as to form a power parallel connection.

According to the charging pile system of parallel charging piles provided in the present disclosure, an existing charging pile in the charging pile system is improved, and power of existing charging piles is interconnected by using charging plugs based on a power requirement of load, to bring about a technical effect that the power of the charging piles can be interconnected in a cost-effective and highly efficient manner when power of one charging pile in the charging pile system is less than the power requirement of the load.

A second aspect of the embodiments of the present disclosure provides a charging method of parallel charging piles, where the charging pile system includes at least two charging piles, a charging plug is disposed on each charging pile, the charging plug is configured to charge load, and the charging plug includes a power cable and a communications cable, and the method includes, disposing a charging plug socket on the at least one charging pile, where the charging plug socket is connected to a power unit inside the charging pile; and sending, by the system when one charging pile on which the charging plug socket is disposed charges the load and a power requirement of the load is greater than power output of the one charging pile that charges the current load and on which the charging plug socket is disposed, an instruction used for instructing to insert a charging plug on another charging pile in the charging pile system into the one charging pile on which the charging plug socket is disposed, so that the power output of the one charging pile that charges the current load meets the power requirement of the current load.

Further, a controller is further disposed on each charging pile, and the controller is configured to control the charging pile to complete actions, including controlling the charging pile to communicate with the load or another charging pile, charge or discharge, send or receive an instruction, and the like.

In an implementation of the second aspect of the embodiments of the present disclosure, after the sending, by the system when one charging pile on which the charging plug socket is disposed charges the load and a power requirement of the load is greater than power output of the one charging pile that charges the current load and on which the charging plug socket is disposed, an instruction used for instructing to insert a charging plug on another charging pile in the charging pile system into the one charging pile on which the charging plug socket is disposed, the method further includes, after the system obtains an instruction used for indicating that the charging plug is connected to the charging socket, jointly outputting, by the two connected charging piles, electric energy for the load.

In an implementation, the sending, by the system when one charging pile on which the charging plug socket is disposed charges the load and a power requirement of the load is greater than power output of the one charging pile that charges the current load and on which the charging plug socket is disposed, an instruction used for instructing to insert a charging plug on another charging pile in the charging pile system into the one charging pile on which the charging plug socket is disposed, so that the power output of the one charging pile that charges the current load meets the power requirement of the current load includes sending, by the system when the one charging pile on which the charging plug socket is disposed charges the load and the power requirement of the load is greater than the power output of the one charging pile that charges the current load and on which the charging plug socket is disposed, an instruction used for instructing to sequentially connect, in series by using respective charging plugs, one or more other charging piles in the charging pile system to the one charging pile on which the charging plug socket is disposed, so that the power output of the one charging pile that charges the current load meets the power requirement of the current load.

In an implementation, the sending, by the system when the one charging pile on which the charging plug socket is disposed charges the load and the power requirement of the load is greater than the power output of the one charging pile that charges the current load and on which the charging plug socket is disposed, an instruction used for instructing to sequentially connect, in series by using respective charging plugs, one or more other charging piles in the charging pile system to the one charging pile on which the charging plug socket is disposed includes, when the one charging pile on which the charging plug socket is disposed charges the load and the power requirement of the load is greater than the power output of the one charging pile that charges the current load and on which the charging plug socket is disposed, after the system determines one or more idle-state charging piles that are closest to the one charging pile that charges the current load and on which the charging plug socket is disposed, sending, by the system, an instruction used for instructing to sequentially connect, in series by using respective charging plugs, the one or more idle-state charging piles that are closest to the charging pile to the one charging pile on which the charging plug socket is disposed.

In an implementation, the disposing a charging plug socket on the at least one charging pile, where the charging plug socket is connected to a power unit inside the charging pile includes disposing the charging plug socket on the at least one charging pile, where the charging plug socket is connected to an output end of the power unit inside the charging pile, to form a serial connection to the power unit.

According to the charging pile system of parallel charging piles or the method provided in the present disclosure, an existing charging pile in the charging pile system is improved, and power of existing charging piles is interconnected by using charging plugs based on a power requirement of load, to bring about a technical effect that the power of the charging piles can be interconnected in a cost-effective and highly efficient manner when power of one charging pile in the charging pile system is less than the power requirement of the load.

DESCRIPTION OF EMBODIMENTS

The present disclosure provides a charging pile system of parallel charging piles and a method. An existing charging pile in the charging pile system is improved, and power of existing charging piles is interconnected by using charging plugs, to resolve a problem that the power of the charging piles cannot be interconnected in a cost-effective and highly efficient manner when power of one charging pile in the charging pile system is less than a power requirement of load.

Figure 1:
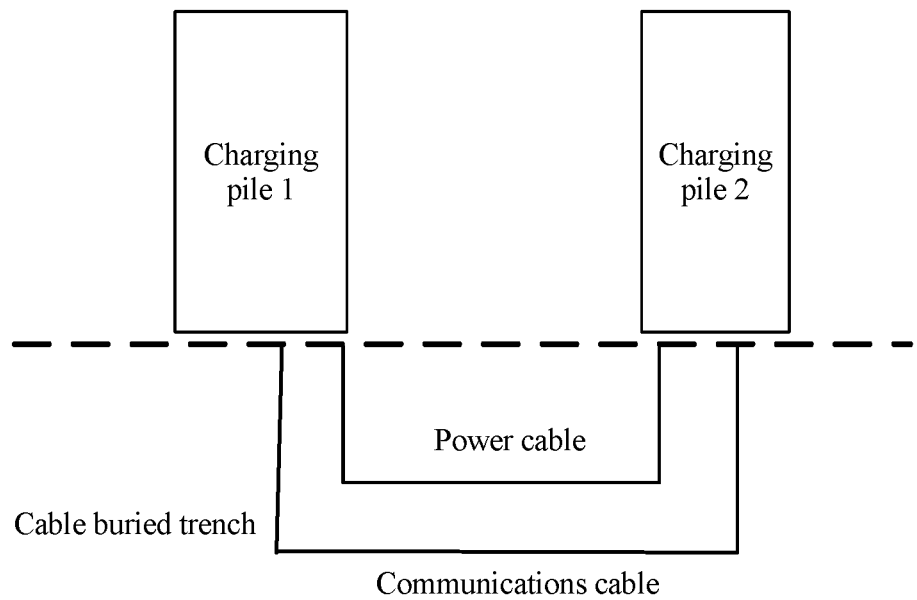
FIG. 1 is a schematic diagram of a charging pile system in other approaches.
Figure 2:
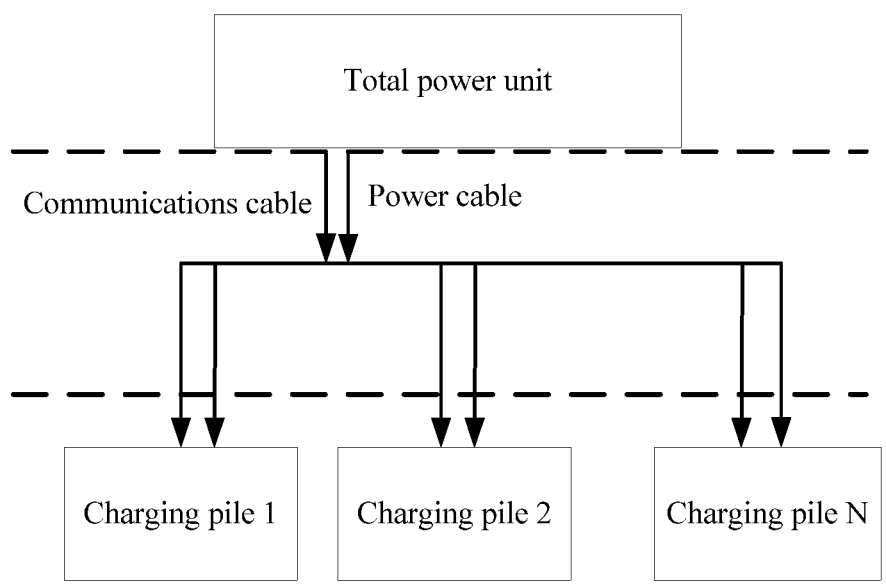
FIG. 2 is a schematic diagram of another charging pile system in other approaches.
Figure 3:
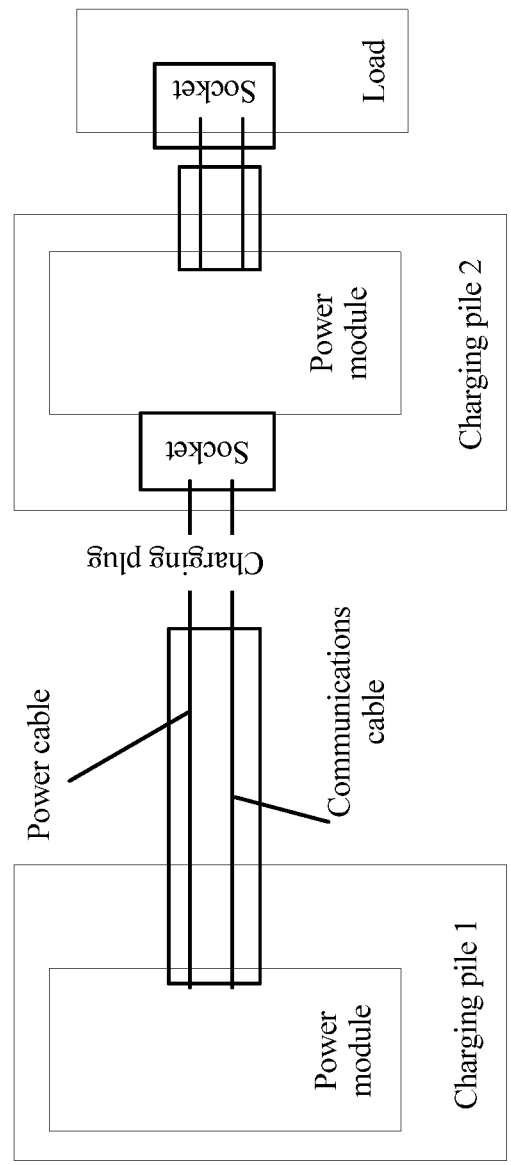
FIG. 3 is a schematic diagram of a charging pile system according to an embodiment of the present disclosure.

As shown in FIG. 3, in an embodiment of the present disclosure, a charging pile system of parallel charging piles is provided. The charging pile system includes at least two charging piles, a charging plug is disposed on each charging pile, the charging plug is configured to charge load, and the charging plug includes a power cable and a communications cable.

A charging plug socket is further disposed on at least one charging pile, one end of the charging plug socket is connected to a power unit inside the charging pile on which the charging plug socket is disposed, and the other end of the charging plug socket is configured to be connected to a charging plug that is on another charging pile and that is inserted into the charging pile on which the charging plug socket is disposed.

When one charging pile on which the charging plug socket is disposed charges the load and a power requirement of the load is greater than power output of the one charging pile that charges the current load and on which the charging plug socket is disposed, the one charging pile is configured to insert the charging plug on the another charging pile in the charging pile system into the charging pile on which the charging plug socket is disposed, so that the power output of the charging pile that charges the current load meets the power requirement of the current load.

In this embodiment, an existing charging pile in the charging pile system is improved, and power of existing charging piles is interconnected by using charging plugs based on a power requirement of load, to bring about a technical effect that the power of the charging piles can be interconnected in a cost-effective and highly efficient manner when power of one charging pile in the charging pile system is less than the power requirement of the load.

Optionally, after detecting that the charging plug on the another charging pile is connected to the charging plug socket on the one charging pile on which the charging plug socket is disposed, the one charging pile on which the charging plug socket is disposed is configured to output power of at least two connected charging piles to the load.

Optionally, when there are a plurality of other charging piles in the charging pile system, the plurality of other charging piles are configured to be sequentially connected, in series by using respective charging plugs, to the one charging pile on which the charging plug socket is disposed.

Optionally, when the one charging pile on which the charging plug socket is disposed charges the load and the power requirement of the load is greater than the power output of the one charging pile that charges the current load and on which the charging plug socket is disposed, the one charging pile is configured to, after determining one or more idle-state charging piles that are closest to the one charging pile that charges the current load and on which the charging plug socket is disposed, send an instruction used for instructing the one or more idle-state charging piles that are closest to the one charging pile to be sequentially connected, in series by using respective charging plugs, to the one charging pile on which the charging plug socket is disposed.

Optionally, on the one charging pile on which the charging plug socket is disposed, the charging plug socket is configured to be connected to an output end of the power unit inside the charging pile by using a contactor, to form a serial connection to the power unit, so as to form a power parallel connection.

Figure 4:
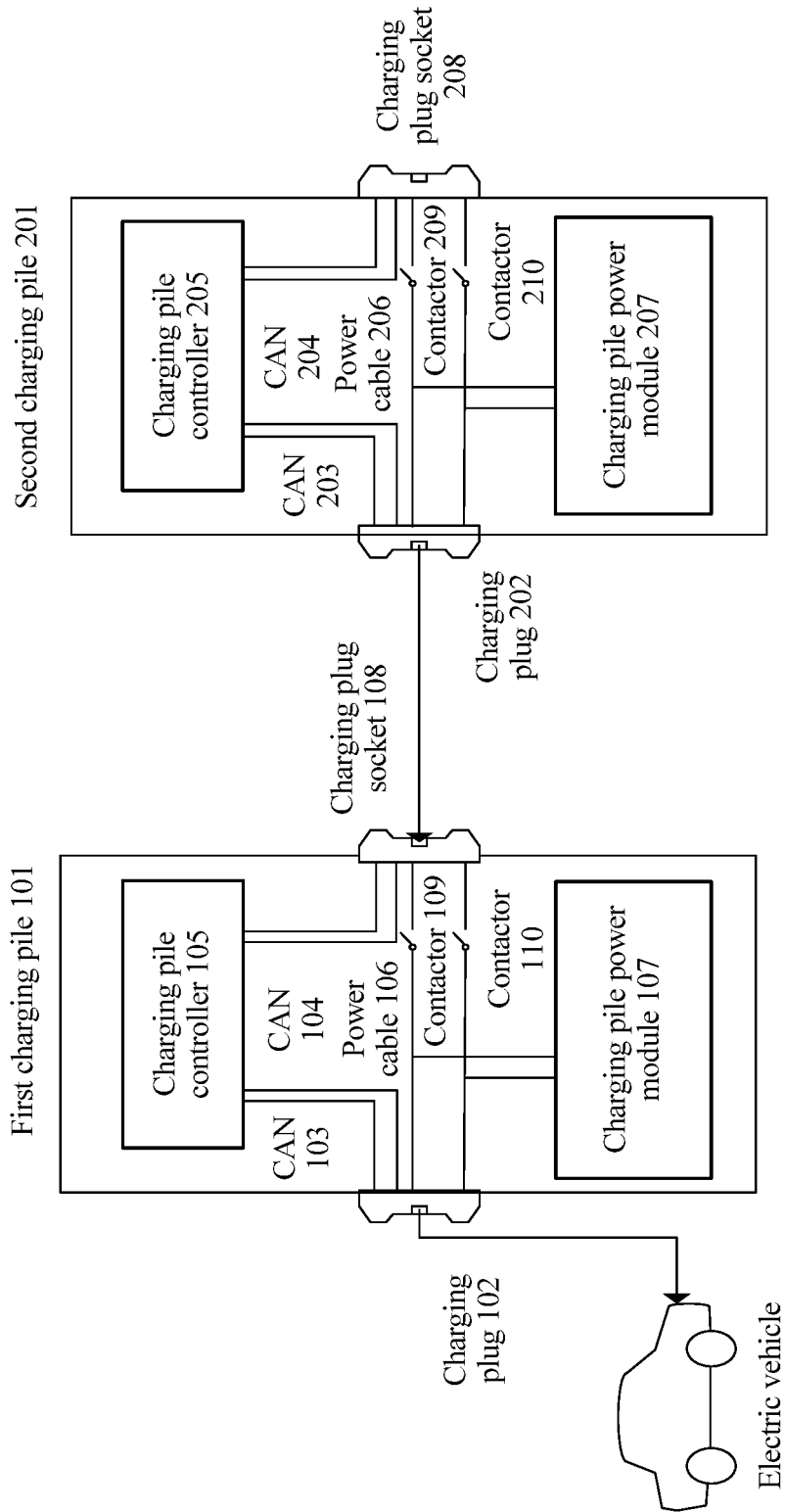
FIG. 4 is a schematic diagram of another charging pile system according to an embodiment of the present disclosure.

In an embodiment, as shown in FIG. 4, the charging pile system includes a first charging pile 101 and a second charging pile 201, and includes a charging plug 102, a communications interface for a controller area network (CAN) bus CAN103, a communications interface CAN104, a charging pile controller 105, a power cable 106, a charging pile power module 107, a charging plug socket 108, a charging plug 202, and another component in the second charging pile 201. Functions of the foregoing units are described as follows.

The first charging pile 101 is configured to provide electric energy required by an electric vehicle.

The charging plug 102 is configured to connect the first charging pile 101 and load. As shown in the figure, when the load is the electric vehicle, the charging plug 102 is configured to transmit energy to and communicate with the electric vehicle.

The communications interface CAN103 is connected to the charging pile controller 105, and is configured to implement communication between the charging pile controller 105 and the electric vehicle, and is also configured to communicate with the second charging pile 201 that is connected in parallel to the first charging pile 101.

The communications interface CAN104 is connected to the charging plug socket 108, and is configured to perform communication between the first charging pile 101 and the second charging pile 201 that are connected in series.

The charging pile controller 105 is configured to control the charging pile to charge or discharge the load, and is configured to control a process of connecting in series to the first charging pile 101 that is connected in parallel to the second charging pile 201, and control and schedule energy transmission and communication between the two charging piles after serial connection.

The power cable 106 is configured to transmit energy in the charging pile.

The charging pile power module 107, namely, an AC-DC conversion unit, is configured to provide energy for the electric vehicle.

The charging plug socket 108 is disposed on the first charging pile 101, and is configured to provide an interface for inserting the charging plug 202 into the charging pile 101, so as to connect the first charging pile 101 and the second charging pile 201 in series, thereby implementing a power parallel connection.

In a process of charging the electric vehicle, a working principle of the system is as follows. When the charging pile controller 105 of the charging pile 101 detects that output power cannot meet a power requirement of the load, namely, the electric vehicle, the charging controller 105 controls to perform physical connection, and controls to insert the charging plug 202 into the charging plug socket 108.

The first charging pile 101 and the second charging pile 201 perform pile-to-pile handshaking. The charging plug 202 is inserted into the charging plug socket 108. The communications interface CAN104 of the charging pile controller 105 and the communications interface CAN203 of a charging pile controller 205 are connected to a same CAN bus, to trigger rearranging of interface CAN addresses, and the charging pile controller 105 and the charging pile controller 205 can identify each other. In the present disclosure, the charging pile controller 105 serves as a host, and is responsible for power allocation and scheduling.

The electric vehicle and the first charging pile 101 perform vehicle-to-pile handshaking, and after the charging plug 102 is inserted into the electric vehicle, handshaking is completed according to the GBT 27930-2015 "Communication protocols between off-board conductive charger and battery management system for electric vehicle". Details are not described herein.

The system performs insulation detection and discharging, including the charging pile controller 105 delivers an insulation detection command to the charging pile controller 205; the charging pile controller 205 controls a charging power module 207 to output an insulation detection output voltage; the 205 reports the insulation detection voltage in real time; and the 105 detects voltages on sides that are of a contactor 109 and a contactor 110 and that are close to the charging plug socket 108. After a voltage U1 detected by the 105 and the voltage reported by the 205 meet an error range, the 105 controls the charging power module to output a voltage U2 to U1 detected by the 105. After U2 and U1 meet the error range, the 105 controls to close the contactor 109 and the contactor 110. The 105 closes main contactors (K1 and K2) in a busbar of the charging pile. For a principle diagram of the contactor (K1 or K2) between the electric vehicle and the first charging pile 101, refer to the GBT 18487.1-2015 "Electric vehicle conductive charging system-Part 1: General requirements".

The first charging pile 101 and the second charging pile 201 perform pile-to-pile parameter cooperation. After the electric vehicle reports a charging requirement, the charging pile controller 105 allocates a current in proportion based on the charging requirement and power of each charging pile. After all output voltages of charging piles that are connected in parallel meet a charging condition, the 105 closes the contactor 109 and the contactor 110, and the 105 closes the main contactors (K1 and K2) in the busbar of the charging pile. For a principle diagram of the contactor (K1 or K2) between the electric vehicle and the first charging pile, refer to the GBT 18487.1-2015 "Electric vehicle conductive charging system-Part 1: General requirements". For energy transmission, the charging pile controller 105 allocates the current in proportion based on the charging requirement and the power of each charging pile.

The system performs intelligent energy adjustment, including the charging pile controller 105 determines, in real time based on a vehicle requirement, a quantity of charging piles that need to be currently connected in parallel. For example, when the charging pile controller 105 detects that the first charging pile 101 can independently meet the charging requirement of the electric vehicle, an output current of the first charging pile 101 is gradually increased, and an output current of the second charging pile 201 is reduced in real time. When the first charging pile can independently provide electric energy, the charging pile controller 105 disconnects the contactors 109 and 110. In this case, a user display of the second charging pile 201 shows that a status of the second charging pile 201 is idle. Charging is completed.

Figure 5:
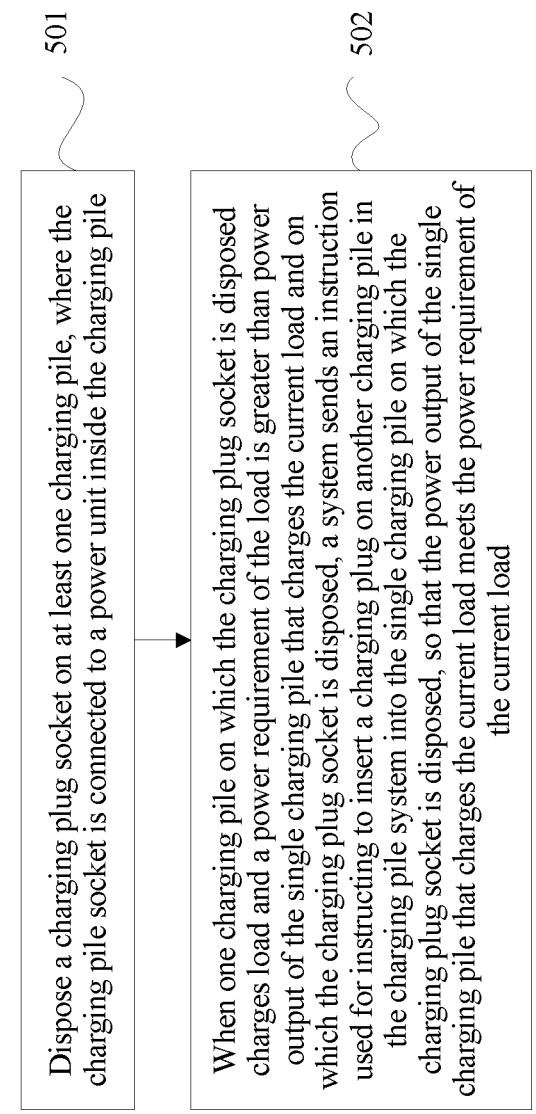
FIG. 5 is a flowchart of a charging method in a charging pile system according to an embodiment of the present disclosure.

FIG. 5 shows a charging method of parallel charging piles provided in an embodiment of the present disclosure. The charging pile system includes at least two charging piles, a charging plug is disposed on each charging pile, the charging plug is configured to charge load, and the charging plug includes a power cable and a communications cable, and the method includes disposing a charging plug socket on the at least one charging pile, where the charging plug socket is connected to a power unit inside the charging pile; and sending, by the system when one charging pile on which the charging plug socket is disposed charges the load and a power requirement of the load is greater than power output of the one charging pile that charges the current load and on which the charging plug socket is disposed, an instruction used for instructing to insert a charging plug on another charging pile in the charging pile system into the one charging pile on which the charging plug socket is disposed, so that the power output of the one charging pile that charges the current load meets the power requirement of the current load.

Optionally, after the sending, by the system when one charging pile on which the charging plug socket is disposed charges the load and a power requirement of the load is greater than power output of the one charging pile that charges the current load and on which the charging plug socket is disposed, an instruction used for instructing to insert a charging plug on another charging pile in the charging pile system into the one charging pile on which the charging plug socket is disposed, the method further includes, after the system obtains an instruction used for indicating that the charging plug is connected to the charging socket, jointly outputting, by the two connected charging piles, electric energy for the load.

Optionally, the sending, by the system when one charging pile on which the charging plug socket is disposed charges the load and a power requirement of the load is greater than power output of the one charging pile that charges the current load and on which the charging plug socket is disposed, an instruction used for instructing to insert a charging plug on another charging pile in the charging pile system into the one charging pile on which the charging plug socket is disposed, so that the power output of the one charging pile that charges the current load meets the power requirement of the current load includes sending, by the system when the one charging pile on which the charging plug socket is disposed charges the load and the power requirement of the load is greater than the power output of the one charging pile that charges the current load and on which the charging plug socket is disposed, an instruction used for instructing to sequentially connect, in series by using respective charging plugs, one or more other charging piles in the charging pile system to the one charging pile on which the charging plug socket is disposed, so that the power output of the one charging pile that charges the current load meets the power requirement of the current load.

Optionally, the sending, by the system when the one charging pile on which the charging plug socket is disposed charges the load and the power requirement of the load is greater than the power output of the one charging pile that charges the current load and on which the charging plug socket is disposed, an instruction used for instructing to sequentially connect, in series by using respective charging plugs, one or more other charging piles in the charging pile system to the one charging pile on which the charging plug socket is disposed includes, when the one charging pile on which the charging plug socket is disposed charges the load and the power requirement of the load is greater than the power output of the one charging pile that charges the current load and on which the charging plug socket is disposed, after the system determines one or more idle-state charging piles that are closest to the one charging pile that charges the current load and on which the charging plug socket is disposed, sending, by the system, an instruction used for instructing to sequentially connect, in series by using respective charging plugs, the one or more idle-state charging piles that are closest to the charging pile to the one charging pile on which the charging plug socket is disposed.

Optionally, the disposing a charging plug socket on the at least one charging pile, where the charging plug socket is connected to a power unit inside the charging pile includes disposing the charging plug socket on the at least one charging pile, where the charging plug socket is connected to an output end of the power unit inside the charging pile, to form a serial connection to the power unit.

According to the charging method of parallel charging piles, an existing charging pile in the charging pile system is improved, and power of existing charging piles is interconnected by using charging plugs based on a power requirement of load, to bring about a technical effect that the power of the charging piles can be interconnected in a cost-effective and highly efficient manner when power of one charging pile in the charging pile system is less than the power requirement of the load.

Figure 6:
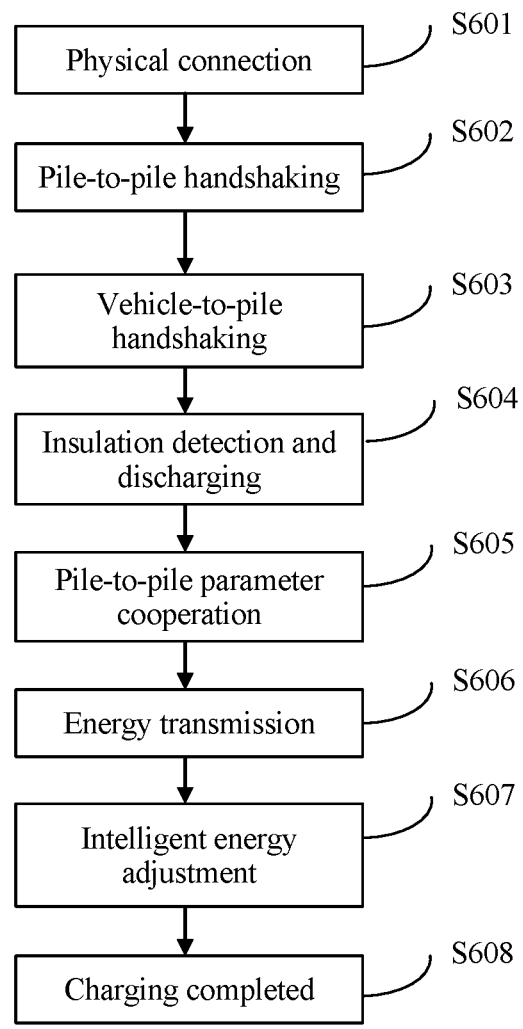
FIG. 6 is a flowchart of another charging method in a charging pile system according to an embodiment of the present disclosure.

FIG. 6 is a method flowchart according to an embodiment of the present disclosure. The method flowchart may be applied to the charging pile system in FIG. 3 or FIG. 4. A method includes the following steps.

Step S601: Physical connection is involved. When a charging pile controller 105 of a charging pile 101 detects that output power cannot meet a power requirement of load, namely, an electric vehicle, the charging controller 105 controls to perform physical connection, and controls to insert the charging plug 202 into a charging plug socket 108.

Step S602: Pile-to-pile handshaking is involved. The first charging pile 101 and a second charging pile 201 perform pile-to-pile handshaking, including, after the charging plug 202 is inserted into the charging plug socket 108, a communications interface CAN104 of the charging pile controller 105 and a communications interface CAN203 of a charging pile controller 205 are connected to a same CAN bus, to trigger rearranging of interface CAN addresses, and the charging pile controller 105 and the charging pile controller 205 can identify each other. In the present disclosure, the charging pile controller 105 serves as a host, and is responsible for power allocation and scheduling.

Step S603: Vehicle-to-pile handshaking is involved. The electric vehicle and the first charging pile 101 perform vehicle-to-pile handshaking, and after a charging plug 102 is inserted into the electric vehicle, handshaking is completed according to the GBT 27930-2015 "Communication protocols between off-board conductive charger and battery management system for electric vehicle". Details are not described herein.

Step S604: Insulation detection and discharging are involved. The system performs insulation detection and discharging including, he charging pile controller 105 delivers an insulation detection command to the charging pile controller 205; the charging pile controller 205 controls a charging power module 207 to output an insulation detection output voltage; the 205 reports the insulation detection voltage in real time; and the 105 detects voltages on sides that are of a contactor 109 and a contactor 110 and that are close to the charging plug socket 108. After a voltage U1 detected by the 105 and the voltage reported by the 205 meet an error range, the 105 controls the charging power module to output a voltage U2 to U1 detected by the 105. After U2 and U1 meet the error range, the 105 controls to close the contactor 109 and the contactor 110. The 105 closes main contactors (K1 and K2) in a busbar of the charging pile. For a principle diagram of the contactor (K1 or K2) between the electric vehicle and the first charging pile 101, refer to the GBT 18487.1-2015 "Electric vehicle conductive charging system-Part 1: General requirements".

Step S605: Pile-to-pile parameter cooperation is involved. The first charging pile 101 and the second charging pile 201 perform pile-to-pile parameter cooperation. After the electric vehicle reports a charging requirement, the charging pile controller 105 allocates a current in proportion based on the charging requirement and power of each charging pile. After all output voltages of charging piles that are connected in parallel meet a charging condition, the 105 closes the contactor 109 and the contactor 110, and the 105 closes the main contactors (K1 and K2) in the busbar of the charging pile. For a principle diagram of the contactor (K1 or K2) between the electric vehicle and a charging pile 1, refer to the National Standard of the Peoples Republic of China GBT 18487.1-2015 "Electric vehicle conductive charging system-Part 1: General requirements".

Step S606: Energy transmission is involved. The charging pile controller 105 allocates the current in proportion based on the charging requirement and the power of each charging pile.

Step S607: Intelligent energy adjustment is involved. The system performs the intelligent energy adjustment including, the charging pile controller 105 determines, in real time based on a requirement of the electric vehicle, a quantity of charging piles that need to be currently connected in parallel. For example, when the charging pile controller 105 detects that the first charging pile 101 can independently meet the charging requirement of the electric vehicle, an output current of the first charging pile 101 is gradually increased, and an output current of the second charging pile 201 is reduced in real time. When the first charging pile can independently provide electric energy, the charging pile controller 105 disconnects the contactors 109 and 110. In this case, a user display of the second charging pile 201 shows that a status of the second charging pile 201 is idle.

Step S608: Complete charging.

According to the charging method in a charging pile system, power of existing charging piles is interconnected by using charging plugs based on a power requirement of load, to bring about a technical effect that the power of the charging piles can be interconnected in a cost-effective and highly efficient manner when power of one charging pile in the charging pile system is less than the power requirement of the load.

A person skilled in the art may clearly understand that, descriptions of the embodiments provided by the present disclosure may be reference for each other. For ease and brevity of description, for example, for functions of the apparatuses and devices and performed steps that are provided in the embodiments of the present disclosure, refer to related descriptions in the method embodiments of the present disclosure. The foregoing descriptions are merely implementations of the present disclosure, but the protection scope of the present disclosure is not limited thereto and also covers other equivalent replacements made by a person skilled in the art.

What is claimed is:
1. A charging pile system, comprising:
a first charging pile;
a first charging plug disposed on the first charging pile and configured to receive power to charge a load, wherein the first charging plug comprises a first power cable and a first communications cable;

a second charging pile in parallel with the first charging pile;

a second charging plug disposed on the second charging pile and configured to receive power to charge the load, wherein the second charging plug comprises a second power cable and a second communications cable; and a charging plug socket disposed on the first charging pile, wherein the charging plug socket comprises a first end and a second directionally opposite end, wherein the first end of the charging plug socket is coupled to a power unit inside the first charging pile, and wherein the second directionally opposite end of the charging plug socket is configured to be coupled to a charging plug on the second charging pile and that is inserted into the second charging pile; and wherein the first charging pile is configured to insert the second charging plug into the first charging pile when the first charging pile currently charges the load and a power requirement of the load is greater than a power output of the first charging pile such that the power output of the first charging pile meets the power requirement of the load, and wherein when the charging pile system comprises other charging piles comprising respective charging plugs, the other charging piles are configured to be sequentially coupled in series to the first charging pile using the respective charging plugs of the other charging piles.

2. The charging pile system of claim 1, wherein after detecting that the second charging plug is connected to the charging plug socket on the first charging pile, the first charging pile is configured to output power of the first charging pile and the second charging pile to the load.

3. The charging pile system of claim 1, wherein when the first charging pile currently charges the load and the power requirement of the load is greater than the power output of the first charging pile that currently charges the load, the first charging pile is configured to send an instruction that instructs one or more idle-state charging piles that are closest to the first charging pile that currently charges the load to be sequentially connected, in series using a respective charging plug of the one or more idle-state charging piles, to the first charging pile after determining the one or more idle-state charging piles are closest to the first charging pile that currently charges the load.

4. The charging pile system of claim 3, wherein the charging plug socket disposed on the first charging pile is configured to be coupled to an output end of the power unit inside the first charging pile using a contactor to form a serial connection to the power unit and to form a power parallel connection to the second charging pile, wherein the power unit comprises the output end.

5. The charging pile system of claim 1, wherein the second charging pile is configured to insert the first charging plug into the second charging pile when a second charging plug socket is disposed on the second charging pile that currently charges the load and a power requirement of the load is greater than a power output of the second charging pile such that the power output of the second charging pile meets the power requirement of the load.

6. The charging pile system of claim 1, further comprising a charging pile controller coupled to the first charging pile and the second charging pile, wherein the charging pile controller is configured to:

control the first charging pile to charge or discharge the load, and control a process of connecting the first charging pile to the second charging pile.

7. The charging pile system of claim 6, wherein the charging pile controller is further configured to control and schedule energy transmission and communication between the first charging pile and the second charging pile.

8. The charging pile system of claim 6, further comprising a communications interface coupled to each of the charging pile controller, the first charging pile and the second charging pile, wherein the communications interface is configured to:

implement communication between the charging pile controller and the load; and communicate with the second charging pile that is connected in parallel to the first charging pile.

9. The charging pile system of claim 1, further comprising a charging pile controller coupled to first charging pile and the second charging pile, wherein the charging pile controller is configured to obtain an instruction that indicates the second charging plug is connected to the charging plug socket after inserting the second charging plug into the first charging pile, and wherein the first charging pile and the second charging pile jointly output electric energy to the load.

10. A charging method implemented by a charging pile system, wherein the charging method comprises:

disposing a first charging plug on a first charging pile to receive power to charge a load, wherein the first charging plug comprises a first power cable and a first communications cable;

disposing a second charging plug on a second charging pile to receive power to charge the load, wherein the second charging plug comprises a second power cable and a second communications cable, wherein the charging pile system comprises the first charging pile and the second charging pile; and disposing a charging plug socket on the first charging pile, wherein the charging plug socket comprises a first end and a second directionally opposite end, and wherein the first end of the charging plug socket is coupled to a power unit inside the first charging pile, and wherein the second directionally opposite end of the charging plug socket is configured to couple to a charging plug on the second charging pile and that is inserted into the second charging pile; and inserting the second charging plug into the first charging pile the first charging that currently charges the load and a power requirement of the load is greater than power output of the first charging pile such that the power output of the first charging pile that currently charges the load meets the power requirement of the load; and sequentially connecting, in series using a respective charging plug of one or more other charging piles, the first charging pile to the one or more other charging piles when the charging pile system comprises the one or more other charging piles.

11. The charging method of claim 10, wherein after the inserting, the method further comprises obtaining an instruction that indicates the charging plug on the second charging pile is connected to the charging plug socket, and wherein two connected charging piles of the one or more other charging piles jointly output electric energy for the load.

12. The charging method of claim 10, further comprising:
sending, when the first charging pile charges the load and a power requirement of the load is greater than power output of the first charging pile that currently charges the load, an instruction that instructs the first charging pile to insert the second charging plug into the first charging pile; and
sequentially connecting, in series using a respective charging plug of one or more other charging piles, the first charging pile to the one or more other charging piles such that the power output of the first charging pile that currently charges the load meets the power requirement of the load.

13. The charging method of claim 12, wherein the sequentially connecting comprises, when the first charging pile currently charges the load and the power requirement of the load is greater than the power output of the first charging pile, sequentially connecting, in series using a respective charging plug of one or more idle-state charging piles, the one or more idle-state charging piles that are closest to the first charging pile after determining that the one or more idle-state charging piles are closest to the first charging pile.

14. The charging method of claim 13, wherein disposing the charging plug socket on the first charging pile comprises connecting the charging plug socket to an output end of the power unit inside the first charging pile to form a serial connection to the power unit and to form a power parallel connection to the second charging pile.

15. The charging method of claim 10, further comprising inserting the first charging plug into the second charging pile when a second charging plug socket is disposed on the second charging pile that currently charges the load and a power requirement of the load is greater than power output of the second charging pile such that the power output of the second charging pile that currently charges the load meets the power requirement of the load.

16. The charging method of claim 10, further comprising:
disposing a charging pile controller on the first charging pile and the second charging pile;
controlling, with the charging pile controller, the first charging pile to charge or discharge the load, and
controlling a process of connecting the first charging pile to the second charging pile.

17. The charging method of claim 16, further comprising scheduling, with the charging pile controller, energy transmission and communication between the first charging pile and the second charging pile.

18. The charging method of claim 16, further comprising:
disposing a communications interface on each of the charging pile controller, the first charging pile and the second charging pile;
implementing, using the communications interface, communication between the charging pile controller and the load; and
communicating, using the communications interface, with the second charging pile that is connected in parallel to the first charging pile.

19. The charging method of claim 17, wherein the scheduling the energy transmission comprises allocating current to the load from the first charging pile and the second charging pile based on a charging requirement and a power of the first charging pile and the second charging pile.

* * * * *

UNITED STATES PATENT AND TRADEMARK OFFICE
CERTIFICATE OF CORRECTION

PATENT NO. : 11,260,763 B2
APPLICATION NO. : 16/511506
DATED : March 1, 2022
INVENTOR(S) : Yangxun Hou, Yongjin Lin and Wenbo Zhang It is certified that error appears in the above-identified patent and that said Letters Patent is hereby corrected as shown below:

In the Claims

Claim 10, Column 12, Line 51: "pile the first" should read "pile when the first"

Claim 10, Column 12, Line 51: "first charging that" should read "first charging pile that"

Signed and Sealed this
Tenth Day of May, 2022

Katherine Kelly Vidal
*Director of the United States Patent and Trademark Office*